United States Patent [19]
Lim et al.

[11] Patent Number: 5,665,821
[45] Date of Patent: Sep. 9, 1997

[54] POLYPHENYLENE ETHER RESIN COMPOSITIONS

[75] Inventors: Jong-chul Lim, Kyungki-do; Jaegoo Doh, Seoul; Hyungsu Kim, Seoul; Jeheum Lee, Seoul; Tae-uk Kim, Kyungki-do, all of Rep. of Korea

[73] Assignee: Cheil Industries Inc., Taegu, Rep. of Korea

[21] Appl. No.: 520,060

[22] Filed: Aug. 28, 1995

[30] Foreign Application Priority Data

Apr. 25, 1995 [KR] Rep. of Korea .................. 95-9731

[51] Int. Cl.$^6$ ........................................... C08G 63/48
[52] U.S. Cl. ................... 525/70; 525/63; 525/64; 525/66; 525/69
[58] Field of Search ........................ 525/63, 64, 66, 525/69, 70

[56] References Cited

U.S. PATENT DOCUMENTS

| | | | |
|---|---|---|---|
| 3,379,792 | 4/1968 | Finholt | 260/857 |
| 4,315,086 | 2/1982 | Ueno et al. | 283/8 |
| 4,681,915 | 7/1987 | Bates et al. | 525/148 |
| 4,839,425 | 6/1989 | Mawatari et al. | 525/92 |

FOREIGN PATENT DOCUMENTS

| | | |
|---|---|---|
| 0046040 | 7/1981 | European Pat. Off. . |
| WO87/00540 | 1/1987 | WIPO . |

*Primary Examiner*—Edward J. Cain
*Attorney, Agent, or Firm*—Woodcock Washburn Kurtz Mackiewicz & Norris LLP

[57] ABSTRACT

The present invention relates to resin compositions having a good compatibility of polyphenylene ether and polyamide and a natural color, which comprise (A) 5 to 95 parts by weight of a polyphenylene ether, (B) 1 to 50 parts by weight of a functionalized aromatic vinyl graft copolymer which is prepared by melt blending 100 parts by weight of a copolymer which is prepared by graft polymerizing 20 to 99 parts by weight of aromatic vinyl monomers onto 1 to 80 parts by weight of synthetic rubber polymer, 0.01 to 2 parts by weight of an organic peroxide and 0.01 to 10 parts by weight of reactive monomers having an unsaturated carboxylic acid or anhydride group, and (C) 5 to 95 parts by weight of a polyamide and optionally (D) up to 40 parts by weight of a synthetic resinous impact modifier.

12 Claims, No Drawings

POLYPHENYLENE ETHER RESIN COMPOSITIONS

FIELD OF THE INVENTION

The present invention relates to a polyphenylene ether resin composition featuring good moldability and excellent color of the molded articles. More particularly, the invention relates to a resin composition which comprises (A) a polyphenylene ether resin, (B) a functionalized aromatic vinyl graft copolymer and (C) a polyamide resin, and optionally (4) a synthetic resinous impact modifier.

BACKGROUND OF THE INVENTION

Polyphenylene ether resin or a blend of polyphenylene ether and polystyrene is excellent in mechanical and electrical properties at relatively higher temperatures. Accordingly, the resins are suitable for a wide range of applications such as automobile parts and electrical and electronic parts. However, the polyphenylene ether resin or a blend thereof has a defect in that it is poor in molding processability, impact resistance and resistance to oil and other chemicals.

Polyamide resin has been used as engineering plastics for various applications, as the resin provides superior chemical resistance and processability in a molding process. However, the applications of polyamide resin are often limited by its poor resistances to heat or impact.

Therefore, in order to remove the defects of the polyphenylene ether and polyamide resin and to maintain the favorable properties of them, numerous researches have been carried out in this area.

A resin composition consisting of (A) a polyphenylene oxide and (B) a polyamide of 0.1 to 25% by weight of the total composition is disclosed and claimed in U.S. Pat. No. 3,379,792. However if the polyamide is in excess of 20% by weight of the total composition, phase separation between the components dominates and leads to poor physical properties of molded articles.

U.S. Pat. No. 4,315,086 discloses a resin composition comprising 5 to 95% by weight of a polyphenylene oxide and 95 to 5% by weight of a polyamide and 0.01 to 30 parts by weight of an ingredient selected from the group consisting of (A) liquid diene polymers, (B) epoxy compounds and (C) compounds having both of (a) a carbon—carbon double or triple bond and (b) a carboxylic acid, acid anhydride, acid amide, imide, carboxylic acid ester, amino or hydroxyl group per 100 parts by weight of the total of polyphenylene oxide and polyamide.

European Patent Publication No. 046,040 discloses a thermoplastic resin composition having high oil-resistance which comprises (A) a polyphenylene ether resin, (B) a copolymer comprising units of a vinyl aromatic compound and an $\alpha,\beta$-unsaturated dicarboxylic acid anhydride or a copolymer comprising units of a vinyl aromatic compound and an imide compound of an $\alpha,\beta$-unsaturated dicarboxylic acid, and (C) a polyamide and optionally (D) a synthetic resinous impact modifier.

PCT International Publication No. WO 87/00540 discloses a method for functionalizing a polyphenylene ether, in which said polyphenylene ether is melt blended, in the absence of free radical initiators, with at least one functionalizing compound having at least one carbon—carbon double or triple bond and at least one carboxylic acid, acid anhydride, acid amide, imide ester, amino or hydroxyl group.

The resin composition containing the above mentioned modified polyphenylene ether has a defect of deteriorating the natural color of the resin during extrusion.

Accordingly the inventors of the present invention have developed a resin composition comprising a polyphenylene ether, a polyamide, a functionalized aromatic vinyl graft copolymer and a synthetic resinous impact modifier, which can provide a good compatibility of the polyphenylene ether and polyamide, and stable natural color during extrusion.

OBJECTS OF THE INVENTION

An object of the present invention is to provide a resin composition comprising a polyphenylene ether, a functionalized aromatic vinyl graft copolymer, a polyamide and a synthetic resinous impact modifier, which has an improved compatibility of the polyethylene ether and polyamide.

Another object of the invention is to provide a polyphenylene ether resin composition which has a natural color on the resin compound or the molded articles thereof without changing the color during extrusion or molding.

A further object of the invention is to provide a polyphenylene ether resin composition which is resistant to impact, chemicals and heat with a superior processability in a molding process, so that the resin composition can be suitable for a wide range of applications.

SUMMARY OF THE INVENTION

According to the present invention, the resin composition having a good compatibility of polyphenylene ether and polyamide with superior natural color comprises (A) 5 to 95 parts by weight of a polyphenylene ether, (B) 1 to 50 parts by weight of a functionalized aromatic vinyl graft copolymer which is prepared by melt blending 100 parts by weight of a copolymer which is prepared by grafting 20 to 99 parts by weight of aromatic vinyl monomers onto 1 to 80 parts by weight of rubber, 0.01 to 2 parts by weight of an organic peroxide and 0.01 to 10 parts by weight of reactive monomers having an unsaturated carboxylic acid or anhydride group, and (C) 5 to 95 parts by weight of a polyamide and optionally (D) up to 40 parts by weight of a synthetic resinous impact modifier.

DETAILED DESCRIPTION OF THE INVENTION

In accordance with the present invention, specific explanations for individual ingredient of the whole resin composition are provided as follows:

Polyphenylene Ether

According to the present invention, a pure polyphenylene ether or a blend of polyphenylene ether and aromatic vinyl polymer may be used As examples of polyphenylene ethers suitable for the use of the present invention, there can be mentioned poly(2,6-dimethyl-1,4-phenylene) ether, poly(2,6-diethyl-1,4-phenylene) ether, poly(2,6-dipropyl-1,4-phenylene) ether, Poly(2-methyl-6-ethyl-1,4-phenylene) ether, Poly(2-methyl-6-propyl-1,4-phenylene) ether, poly(2-ethyl-6-propyl-1,4-phenylene) ether, poly(2,6-diphenyl-1,4-phenylene) ether, copolymer of poly(2,6-dimethyl-1,4-phenylene) ether and poly(2,3,6-trimethyl-1,4-phenylene) ether, and copolymer of poly(2,6-dimethyl-1,4-phenylene) ether and poly(2,3,6-trimethyl-1,4-phenylene) ether. Poly(2,6-dimethyl-1,4-phenylene) ether and copolymer of poly(2,6-dimethyl-1,4-phenylene) ether and poly(2,3,6-trimethyl-1,4-phenylene) ether may be more preferably used. The most preferable polyphenylene ether is poly(2,6-dimethyl-1,4-phenylene) ether. Among the above mentioned polyphenylene ethers, at least one or more of the polyphenylene ethers may be used as polyphenylene ether component in this invention.

The degree of polymerization of polyphenylene ether is not limited in particular. However, considering heat-stability or processability of the resin composition, it is preferable that intrinsic viscosity of the resin is in the range of 0.2 to 0.8 dl/g at 25° C. in chloroform solution It is known that polyphenylene ether has a good compatibility with aromatic vinyl polymer. Thus, in this invention, a blend of polyphenylene ether and aromatic vinyl compound may be used. Examples of the aromatic vinyl compound are polystyrene, high impact polystyrene (HIPS), polychlorostyrene, poly-alpha-methylstyrene and poly-t-butylstyrene, of which one single compound or a mixture of two or more compounds may be blended with the above mentioned polyphenylene ether. Polystyrene and HIPS may be more preferable used in this invention. The degree of polymerization of the aromatic vinyl compound is not limited in particular. However, considering heat-stability or processability of the compound, it is preferable that the average molecular weight is in the range of 20,000 to 500,000.

The polyphenylene ether or blend of polyphenylene ether and aromatic vinyl compound may be used in the range of 5 to 95 parts by weight per the total resin composition of the present invention.

(B) Functionalized Aromatic Vinyl Graft Copolymer

The functionalized aromatic vinyl graft copolymer according to the present invention is prepared by melt blending in the melt (a) 100 parts by weight of a copolymer which is obtained by graft copolymerizing 20 to 99 parts by weight of aromatic vinyl monomers onto 1 to 80 parts by weight of rubber, (b) 0.01 to 2 parts by weight of an organic peroxide and (c) 0.01 to 10 parts by weight of reactive monomers having an unsaturated carboxylic acid or anhydride group. The functionalized aromatic vinyl graft copolymer is used in the range of 1 to 50 parts by weight per the entire resin composition of the present invention.

As examples of the rubber suitable for the use of the present invention, there can be mentioned diene rubber, ethylene rubber and ethylene/propylene/diene terpolymer rubber. At least one or more rubber(s) may be used to prepare the copolymer(a). The average particle size of the rubber may vary from 0.02 to 1.0 µm. The average particle size of 0.05 to 0.5 µm is preferable. If the size is less than 0.05 µm, it has a difficulty in preparing the modified aromatic vinyl graft copolymer, and if the size is in excess of 0.5 µm, the improvement of toughness is limited.

Examples of the aromatic vinyl monomers are styrene, para-t-butylstyrene, alpha-methylstyrene, beta-methylstyrene, vinyl xylene, monochlorostyrene, dichlorostyrene, dibromostyrene, ethylstyrene, vinyl naphthalene and divinylbenzene. Styrene and alpha-methylstyrene may be preferably employed in this invention.

The copolymer(a) is prepared by graft copolymerizing 20 to 99 parts by weight of aromatic vinyl monomers onto 1 to 80 parts by weight of rubber. Typical examples of the methods include emulsion polymerization, suspension polymerization, and bulk continuous polymerization. Among these, emulsion polymerization is frequently practiced, which produce the copolymer(a) by polymerizing aromatic vinyl monomers with an initiator in the presence of rubber material.

The functionalized aromatic vinyl graft copolymer for the present invention is prepared by melt blending (a) 100 parts by weight of the copolymer, (b) 0.01 to 2 parts by weight of an organic peroxide, and (c) 0.01 to 10 parts by weight of reactive monomers.

Examples of the organic peroxide(b) which is used for preparing said functionalized aromatic vinyl graft copolymer are diisopropyl benzene hydroperoxide, di-t-butylperoxide, para-ethanehydroperoxide, t-butylcumylperoxide, dicumylperoxide, 2,5-dimethyl-2,5-di (t-butylperoxy) hexane, di-t-butylperoxyphyalate, succinic acid peroxide, t-butyldiperoxybenzoate, t-butylperoxymaleic acid, t-butylperoxyisopropylcarbonate, methylethyl ketone peroxide and cyclohexanone peroxide. At least one or more organic peroxide may be used to prepare said functionalized aromatic vinyl graft copolymer. Dicumylperoxide may be preferably used in light of reactivity and processability.

As examples of reactive monomers(c) having an unsaturated carboxylic acid or anhydride group, there can be mentioned maleic acid anhydride, maleic acid, itaconic acid anhydride, fumaric acid, acrylic acid and methacrylic acid ester, of which maleic acid anhydride is preferably used.

Methods of preparing the functionalized aromatic vinyl graft copolymer are not limited in particular. However, considering the grafting efficiency, it is preferable to carry out the graft reaction of the mixture comprising copolymer (a), organic peroxide(b) and reactive monomers(c) in the melt by using a Banbury mixer or a vent type extruder.

The reactive monomers(c) having an unsaturated carboxylic acid or anhydride group may be used in the range of 0.01 to 10 parts by weight per the total resin composition of this invention. More preferably, the reactive monomers may be used in the range of 0.1 to 7 parts by weight. If the reactive monomers is less than 0.1 parts by weight, the resin composition does not have good compatibility. On the contrary, if the reactive monomers is in excess of 7 parts by weight, the resin composition has poor processability and physical properties due to excessive reaction of the reactive monomers.

When preparing the functionalized aromatic vinyl graft copolymer for the present invention, an organic peroxide(b) is used in the range of 0.01 to 2 parts by weight per the copolymer. If the organic peroxide is in excess of 2 parts by weight, the resin composition of the present invention has poor heat stability and physical properties due to degradation of the resin composition.

The functionalized aromatic vinyl graft copolymer may be used in the range from 1 to 50 parts by weight per the total resin composition of the present invention. More preferably, the copolymer may be used in the range of 3 to 30 parts by weight. If the copolymer is used less than 3 parts by weight, the resin composition of the present invention has poor compatibility, on the contrary if the copolymer is in excess of 30 parts by weight, the resin composition has poor heat resistance.

(C) Polyamide

Polyamide resins that may be used in the present invention are (a) nylon resins such as polycaprolactams(nylon 6), poly-11-aminoundecanoyl acids(nylon 11), polyauryllactams(nylon 12), polyhexamethylene adipamides(nylon 6,6), polyhexaethylene azelamide(nylon 6,9) polyhexamethylene sebacamide(nylon 6,12); and (b) copolymer of nylon resins such as nylon 6/nylon 6,10, nylon 6/nylon 6,6 and nylon 6/nylon 12. The thermoplastic resin composition of the present invention includes at least one component from the above-listed nylon resins and copolymers thereof.

For satisfactory physical properties and heat resistance of the resin compositions, a polyamide resin with a melting point above 200° C. and a relative viscosity (measured at 25° C. with 1 weight % of polyamide resin added to m-cresol) of 2.0 dl/g or higher may preferably be employed.

(D) Synthetic Resinous Impact Modifier

The synthetic resinous impact modifiers for the present invention are vinyl aromatic monomer-based resins which are block copolymers comprising monoalkenyl arene (usually styrene) blocks and conjugated diene (e.g. butadiene or isoprene) or olefin (e.g. ethylene-propylene, ethylene-butylene) blocks, which are, according to the number of blocks in the repeat unit, referred as diblock (AB type) or triblock (ABA type) copolymers. The conjugated diene blocks may be partially or entirely hydrogenated, whereupon the properties are similar to the olefin block copolymers.

Examples of suitable AB type block copolymers are polystyrene-polybutadiene (SBR), polystyrene-polyisoprene and poly (alpha-methylstyrene)-polybutadiene. Such AB type block copolymers are commercially available from a number of sources, including Phillips Petroleum under the trademark of SOLPRENE and Shell under the trademarks of KRATON D and KRATON G.

Examples of suitable ABA type block copolymers are polystyrene-polybutadiene-polystyrene (SBS), polystyrene-polyisoprene-polystyrene (SIS), poly(alpha-methylstyrene)-polybutadiene-poly(alpha-methylstyrene) and poly(alpha-methylstyrene)-polyisoprene-poly-(alpha-methylstyrene). Such ABA block copolymers are commercially available from a number of sources, including Shell under the trademarks of CARIFLEX, KRATON D and KRATON G and Kuraray under the trademark of SEPTON.

The polyphenylene ether resin compositions according to the present invention comprises (A) 5 to 95 parts by weight of a polyphenylene ether, (B) 1 to 50 parts by weight of a functionalized aromatic vinyl graft copolymer and (C) 5 to 95 parts by weight of a polyamide and optionally (D) up to 40 parts by weight of a synthetic resinous impact modifier. The resin compositions of the present invention can be prepared by any known method for melt-processing of multicomponent synthetic resins. One of the typical methods is to mix the components (A), (B), (C), and (D) together, and to prepare the resin compositions in a form of pellet through an extruder. More preferably, after mixing the components (A), (B) and (D) first and extruding the mixture, a polyamide (C) is added to the previously extruded mixture, then finally the resin composition is prepared in a form of pellet through an extruder.

Various additives may be added for a particular purpose in the preparation of thermoplastic resin compositions of the present invention. For example, glass fiber, carbon fiber, talc, silica, mica, and/or alumina may be added for improving the mechanical strength or heat distortion temperature of molded products. The compositions may include other additives such as light stabilizers, antioxidants, flame retardants, lubricants, dyes and pigments.

The invention may be better understood by reference to the following examples which are intended for purposes of illustration and are not to be construed as in any way limiting the scope of the present invention, which is defined in the claims appended hereto.

EXAMPLES

The ingredients used in the Examples are as follows:

(A) Polyphenylene Ether

The polyphenylene ether employed in the Examples is a product of Asahi Kasei Co. of Japan, and a polystyrene which is blended with the polyphenylene ether is a product of Cheil Industries Inc. of Korea (Grade Name: HR-2390).

(B) Functionalized Aromatic Vinyl Graft Copolymer

The components for preparing the functionalized aromatic vinyl graft copolymer are (a) an aromatic vinyl graft copolymer, (b) an organic peroxide and (c) reactive monomers.

The aromatic vinyl graft copolymer (a) was prepared by emulsion polymerization charging 300 g of polybutadiene latex with average diameter of 0.1 μm and 700 g of styrene in a reactor and adding 5 g of potassium persulfate and 5 g of sodium oleate to the reactor, by which styrene is graft polymerized onto butadiene rubber. High impact polystyrene (HIPS, Grade name: HG-1760) of Cheil Industries Inc. was employed in Example 6 as an aromatic vinyl graft copolymer component instead of copolymer(a). Maleic acid anhydride was used as reactive monomers(c) and dicumyl peroxide was used as organic peroxide(b).

The compositions for preparing the functionalized aromatic vinyl graft copolymer are shown in Table 1. The functionalized copolymers (B1~B5) were prepared in a form of pellet through a single-screw extruder. The functionalized copolymer (B6) was prepared in a form of pellet through a twin-screw extruder. The cylinder temperatures of cylinders were set in the range of 150°~220° C. The single screw extruder was operated at a speed of 100 rpm and the twin-screw extruder was operated at a speed of 300 rpm. In Table 1, the graft ration of maleic acid anhydride was shown, which was calculated by measuring the area at a band of 1780 cm$^{-1}$ of maleic acid anhydride after precipitating the resin pellet in chloroform/methanol solution.

TABLE 1

|  | B1 | B2 | B3 | B4 | B5 | B6 |
|---|---|---|---|---|---|---|
| Copolymer Synthesized | 100 | 100 | 100 | 100 | 100 | — |
| HG-1760 | — | — | — | — | — | 100 |
| Maleic Acid Anhydride | 0.1 | 1.0 | 3.0 | 5.0 | 8.0 | 5.0 |
| Dicumyl Peroxide | 0.02 | 0.05 | 0.15 | 0.25 | 0.35 | 0.25 |
| Graft Ratio | 0.1 | 0.95 | 2.7 | 4.2 | 5.5 | 3.9 |

All numbers are in grams except the graft ratio.

(C) Polyamide

Two different polyamide resins were used in the Examples of the present invention. One is nylon 6 (product #: KN-170) of Kolon Co., Ltd. of Korea and the other is nylon 6.6 (product #: 40-IB) of Monsanto Co., Ltd. of U.S.A.

(D) Synthetic Resinous Impact Modifier

KRATON G 1651 of Shell U.S.A. was used in the Examples as a synthetic resinous impact modifier.

EXAMPLES 1–7

Using the ingredients mentioned above, the resin compositions of Examples 1–7 were prepared. The components and compositions thereof are shown in Table 2. First, polyphenylene ether(A), functionalized aromatic vinyl graft copolymer(B) and synthetic resinous impact modifier(D) were mixed with a Hensel mixer. The mixture was then made into a pellet form using a twin-screw extruder having a diameter of 40 mm. The cylinder temperature of the extruder was in the range of 230°~320° C., and the rotation speed of the screw was 300 rpm. The pellet obtained from the previous step and polyamide(C) were mixed again with a Hensel mixer, and then extruded in a form of pellet. The pellets were dried at 80° C. for 6 hours and molded into test specimens in a 6 oz injection molding machine at molding temperature of 230°~320° C. and mold temperature of 60°~90° C.

TABLE 2

| Components | | | Examples | | | | | | |
|---|---|---|---|---|---|---|---|---|---|
| | | | 1 | 2 | 3 | 4 | 5 | 6 | 7 |
| (A) | Polyphenylene Ether | | 35 | 35 | 30 | 35 | 30 | 30 | 45 |
| | Polystyrene | | 5 | 5 | — | — | 10 | — | — |
| Modified Aromatic | | B1 | 10 | — | — | — | — | — | — |
| Vinyl Graft | | B2 | — | 10 | — | — | — | — | — |
| Copolymer(B) | | B3 | — | — | 10 | — | — | — | — |
| | | B4 | — | — | — | 10 | — | — | 10 |
| | | B5 | — | — | — | — | 10 | — | — |
| | | B6 | — | — | — | — | — | 10 | — |
| Polyamide(C) | | KN-171 | 45 | — | 50 | 45 | 45 | 50 | — |
| | | 40-IB | — | 45 | — | — | — | — | 40 |
| Synthetic Resinous Impact Modifier(D) | | | 5 | 5 | 10 | 10 | 10 | 5 | 5 |

All numbers are in grams.

The physical properties of the test samples of Examples 1–7 were measured and shown in Table 3. Izod impact strength were tested according to ASTM D 256(¼" and ⅛", notched). Tensile strength and elongation were measured according to ASTM D 638, heat distortion temperature (¼", 4.6 kg weight) was measured according to ASTM D 648, and whiteness was measured by a color indexer.

TABLE 3

| Physical Properties | Units | Examples | | | | | | |
|---|---|---|---|---|---|---|---|---|
| | | 1 | 2 | 3 | 4 | 5 | 6 | 7 |
| Tensile Strength | KG/CM$^2$ | 490 | 520 | 550 | 540 | 480 | 530 | 560 |
| Elongation | % | 30 | 110 | 110 | 100 | 50 | 70 | 80 |
| ¼" Impact Strength | KG.CM/CM | 9 | 27 | 70 | 38 | 12 | 12 | 27 |
| ⅛" Impact Strength | KG.CM/CM | 8 | 35 | 90 | 55 | 12 | 12 | 39 |
| Heat Distortion Temp. | °C. | 168 | 171 | 160 | 164 | 161 | 159 | 181 |
| Whiteness | — | 55 | 56 | 65 | 62 | 58 | 63 | 58 |

As shown in Table 3, in case that the content of maleic acid anhydride is less than 0.1 parts or in excess of 7 parts by weight per total resin composition, the mechanical properties of corresponding resin compositions are deteriorated.

COMPARATIVE EXAMPLES 1–4

Comparative Examples 1–4 were prepared by using components as shown in Table 4.

TABLE 4

| Components | | Comparative Examples | | | |
|---|---|---|---|---|---|
| | | 1 | 2 | 3 | 4 |
| (A) | Polyphenylene Ether | 40 | 40 | 45 | 40 |
| | Polystyrene | — | 5 | 10 | 5 |
| Modified Aromatic Vinyl Graft Copolymer(B) | | 10 | — | — | 10* |

TABLE 4-continued

| Components | Comparative Examples | | | |
|---|---|---|---|---|
| | 1 | 2 | 3 | 4 |
| Polyamide(C) KN-171 | 45 | 50 | 45 | 40 |
| Synthetic Resinous Impact Modifier(D) | 5 | 5 | — | 5 |

All numbers are in grams.
*Maleic acid anhydride grafted polyethylene ether

The preparing methods of test samples from comparative Examples 1–4 were the same as those of Examples 1–7. The testing methods of comparative Examples 1–4 were the same as those of Examples 1–7. The test results are shown in Table 5.

TABLE 5

| Physical Properties | Units | Examples | | | |
|---|---|---|---|---|---|
| | | 1 | 2 | 3 | 4 |
| Tensile Strength | KG/CM$^2$ | 550 | 275 | 280 | 597 |
| Elongation | % | 95 | 2.7 | 1.7 | 86 |
| ¼" Impact Strength | KG.CM/CM | 28 | 2.2 | 1.2 | 11 |
| ⅛" Impact Strength | KG.CM/CM | 35 | 2.5 | 1.5 | 13 |
| Heat Distortion Temp. | °C. | 180 | 178 | 175 | 182 |
| Whiteness | — | 60 | 65 | 62 | 46 |

According to Examples 1–7 and Comparative Examples 1–4, it is evident that the present polyphenylene ether resin compositions comprising the functionalized aromatic vinyl graft copolymer provide good physical properties and a better natural color, compared to the resin composition having modified polyphenylene ether.

What is claimed is:

1. A resin composition with excellent natural color on molded articles consisting essentially of;
   (A) 5 to 95 parts by weight of a polyphenylene ether;
   (B) 1 to 50 parts by weight of a functionalized aromatic vinyl graft copolymer which is prepared by melt blending in the melt 100 parts by weight of a graft copolymer (a) prepared by grafting 20–99 parts by weight of aromatic vinyl monomers onto 80 to 1 parts of synthetic rubber polymer, 0.01 to 2 parts by weight of an organic peroxide(b) and 0.01 to 10 parts by weight of reactive monomers(c) having an unsaturated carboxylic acid or anhydride group; and
   (C) 5 to 95 parts by weight of a polyamide and optionally
   (D) 0 to 40 parts by weight of a synthetic resinous impact modifier.

2. The resin composition according to claim 1 wherein said polyphenylene ether is pure polyphenylene ether or a blend of a polyphenylene ether and an aromatic vinyl polymer.

3. The resin composition according to claim 1 wherein said polyphenylene ether is selected from the group consisting of poly(2,6-dimethyl-1,4-phenylene) ether, poly(2,6-diethyl-1,4-phenylene) ether, poly(2,6-dipropyl-1,4-phenylene) ether, poly(2-methyl-6-ethyl-1,4-phenylene) ether, poly(2-methyl-6-propyl-1,4-phenylene) ether, poly(2-ethyl-6-propyl-1,4-phenylene) ether, poly(2,6-diphenyl-1,4-phenylene) ether, copolymer of poly(2,6-dimethyl-1,4-phenylene) ether and poly(2,3,6-trimethyl-1,4-phenylene) ether, and copolymer of poly(2,6-dimethyl-1,4-phenylene) ether and poly(2,3,6-trimethyl-1,4-phenylene) ether.

4. The resin composition according to claim 2 wherein said aromatic vinyl polymer is selected from the group consisting of polystyrene, high impact polystyrene (HIPS), polychlorostyrene, poly-alpha-methylstyrene and poly-t-butylstyrene.

5. The resin composition according to claim 1 wherein said synthetic rubber polymer is selected from the group consisting of diene rubber, ethylene rubbr and ethylene/propylene/diene terpolymer rubber.

6. The resin composition according to claim 5 wherein said synthetic rubber polymer has average particulate size of 0.02 to 1.0 μm.

7. The resin composition according to claim 1 wherein said aromatic vinyl monomer is selected from the group consisting of styrene, para-t-butylstyrene, alpha-methylstyrene, beta-methylstyrene, vinyl xylene, monochlorostyrene, dichlorostyrene, dibromostyrene, ethylstyrene, vinyl naphthalene and divinylbenzene.

8. The resin composition according to claim 1 wherein said reactive monomer is selected from the group consisting of maleic acid anydride, maleic acid, itaconic acid anhydride, fumaric acid, acrylic acid and methacrylic acid ester.

9. The resin composition according to claim 1 wherein said organic peroxide is selected from the group consisting of diisopropyl benzenehydroperoxide, di-t-butylperoxide, para-ethanehydroperoxide, t-butylcumylproxide, dicumylperoxide, 2,5-dimethyl-2,5-di(t-butylperoxy)hexane, di-t-butylperoxyphthalate, succinic acid peroxide, t-butyl diperoxybenzoate, t-butylperoxymaleic acid, t-butylperoxy isopropylcarbonate, methylethyl ketone peroxide and cyclohexanone peroxide.

10. The resin composition according to claim 1 wherein said functionalized aromatic vinyl graft copolymer is in the range from 3 to 30 parts by weight per 100 parts by weight of all resin in the composition.

11. The resin composition according to claim 6 wherein said synthetic rubber polymer has average particle size of 0.05 to 0.5 μm.

12. The resin composition according to claim 8 wherein said reactive monomer is in the range from 0.1 to 7 parts by weight per the entire resin composition.

* * * * *